United States Patent
Wang et al.

(10) Patent No.: US 10,420,108 B2
(45) Date of Patent: Sep. 17, 2019

(54) ACQUISITION AND TRACKING APPARATUS FOR FREE SPACE OPTICAL COMMUNICATIONS

(71) Applicant: X Development LLC, Mountain View, CA (US)

(72) Inventors: Chiachi Wang, Union City, CA (US); Sheng-Hui Yang, San Jose, CA (US); Romain Clement, Campbell, CA (US); Michael Sholl, Pacifica, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 16/020,357

(22) Filed: Jun. 27, 2018

(65) Prior Publication Data

US 2019/0021087 A1    Jan. 17, 2019

Related U.S. Application Data

(63) Continuation of application No. 15/156,459, filed on May 17, 2016, now Pat. No. 10,039,103.

(51) Int. Cl.
  *H04B 10/00*  (2013.01)
  *H04W 72/04*  (2009.01)
  (Continued)

(52) U.S. Cl.
  CPC .... *H04W 72/0453* (2013.01); *H04B 7/18513* (2013.01); *H04B 10/1123* (2013.01)

(58) Field of Classification Search
  CPC ........... H04W 72/0453; H04B 7/18513; H04B 10/1123
  See application file for complete search history.

(56) References Cited

U.S. PATENT DOCUMENTS 3,449,577 A * 6/1969 Kogelnik ............... G03H 1/041
                                                  359/11
5,594,580 A   1/1997 Sakanaka et al.
(Continued)

FOREIGN PATENT DOCUMENTS

EP    0642236 A2    3/1995
EP    0724340 A1    7/1996
(Continued)

OTHER PUBLICATIONS

United Kingdom Search Report for the related Application No. GB1707737.1 dated Nov. 15, 2017.
(Continued)

*Primary Examiner* — Tesfaldet Bocure
(74) *Attorney, Agent, or Firm* — Botos Churchill IP Law LLP

(57) ABSTRACT

A method includes receiving a first optical signal at a first communication terminal from a second communication terminal through a free space optical link. The received optical signal contains a modulated unique frequency tone. The method also includes mixing the modulated unique frequency tone with a reference signal to provide a mixed output signal and determining a signal strength of the modulated unique frequency tone based on the mixed output signal. The reference signal includes a same frequency as the modulated unique frequency tone. The method adjusts an optical head of the first communication terminal to establish acquisition and optical beam pointing with the second communication terminal based on the signal strength of the modulated unique frequency tone received from the second communication terminal.

20 Claims, 9 Drawing Sheets

(51) Int. Cl.
*H04B 10/112* (2013.01)
*H04B 7/185* (2006.01)

(56) References Cited

U.S. PATENT DOCUMENTS

| | | |
|---|---|---|
| 5,654,816 A | 8/1997 | Fishman |
| 5,684,614 A | 11/1997 | Degura |
| 6,483,621 B1 | 11/2002 | Adams et al. |
| 6,504,634 B1 | 1/2003 | Chan et al. |
| 6,941,076 B1 | 9/2005 | Adams et al. |
| 2003/0207697 A1 | 11/2003 | Shpak |
| 2007/0031151 A1 | 2/2007 | Cunningham et al. |
| 2009/0323163 A1 | 12/2009 | Steinkraus, Jr. et al. |
| 2016/0165325 A1* | 6/2016 | Coleman .............. H04B 10/118 398/45 |

FOREIGN PATENT DOCUMENTS

| | | |
|---|---|---|
| EP | 1158704 A1 | 11/2001 |
| WO | 0025454 A1 | 5/2000 |
| WO | 0211319 A1 | 2/2002 |
| WO | 02073835 A1 | 9/2002 |

OTHER PUBLICATIONS

International Search Report and Written Opinion for Application No. PCT/US2017/029661 dated Jul. 28, 2017.
Search Report for German Patent Application No. 102017109807.0, dated Nov. 12, 2018. 9 pages.

* cited by examiner

ACQUISITION AND TRACKING APPARATUS FOR FREE SPACE OPTICAL COMMUNICATIONS

CROSS-REFERENCE TO RELATED APPLICATIONS

The present application is a continuation of U.S. patent application Ser. No. 15/156,459, filed May 17, 2016, now issued as U.S. Pat. No. 10,039,103 on Jul. 31, 2018, the disclosure of which is incorporated herein by reference.

TECHNICAL FIELD

This disclosure relates to acquisition and tracking for free space optical communications between communication terminals.

BACKGROUND

Communication terminals may transmit and receive optical signals through free space optical links. Communicating terminals generally use acquisition and tracking systems to establish the optical link by pointing optical beams toward one another. For instance, a transmitting terminal may use a beacon laser to illuminate a receiving terminal while the receiving terminal may use a position sensor to locate the transmitting terminal to monitor the beacon laser. Additionally, steering mechanisms may maneuver the terminals to point toward each other and to track the pointing once acquisition is established. For communication terminals that move relative to one another at high speeds, such as satellites or high altitude communication devices, a fast steering mirror or a fast gimbal is generally used as the steering mechanism. Such acquisition and tracking systems used to connect moving communication terminals are costly due to the high level of sophistication required for moving terminals. Communication terminals installed on buildings, however, are relatively stable, and may therefore establish the optical link using a simpler acquisition and tracking functionality than those associated with communication terminals that move relative to one another.

SUMMARY

One aspect of the disclosure provides a method for acquisition and tracking of free spec optical communication. The method includes receiving, at a first communication terminal, an optical signal from a second communication terminal through a free space optical link, the received optical signal containing a modulated unique frequency tone. The method also includes mixing, by control hardware of the first communication terminal, the modulated unique frequency tone with a reference signal to provide a mixed output signal. The reference signal includes a same frequency as the modulated unique frequency tone. The method further includes determining, by the control hardware, a signal strength of the modulated unique frequency tone based on the mixed output signal. The method also includes adjusting, by the control hardware, an optical head of the first communication terminal to establish acquisition and optical beam pointing with the second communication terminal based on the signal strength of the modulated unique frequency tone received from the second communication terminal.

Implementations of the disclosure may include one or more of the following optional features. In some implementations, the second communication terminal combines a data signal including one or more data packets and a beacon signal modulated at the unique frequency tone onto a multiplexed optical carrier including the optical signal for transmission to the first communication terminal. The second communication terminal may use one of a wavelength division multiplexer or a polarization multiplexer to combine the data signal and the beacon signal onto the multiplexed optical carrier.

In some examples, when the first communication terminal receives the optical signal from the second communication terminal, the method includes de-multiplexing, by the control hardware, the received optical signal into the data signal and the beacon signal. In these examples, mixing the modulated unique frequency tone includes mixing the received beacon signal with the reference signal from a local oscillator of the first communication terminal to provide the mixed output signal. The second communication terminal may combine the modulated unique frequency tone onto a modulated data signal containing a stream of data packets to produce the optical signal for transmission to the first communication terminal. The modulated unique frequency tone may include a lower frequency than a frequency of the modulated data signal. The modulated unique frequency tone may also include a smaller power modulation depth than the modulated data signal.

In some implementations, when the first communication terminal receives the optical signal from the second communication terminal, the method includes splitting, by the control hardware, the optical signal into the modulated data signal and the modulated unique frequency tone, and encoding, by the control hardware, the stream of data packets on the modulated data signal. Mixing the modulated unique frequency tone may include mixing the modulated unique frequency tone with the reference signal from a local oscillator of the first communication terminal to provide the mixed output signal. Moreover, mixing the modulated unique frequency tone with the reference signal may eliminate noise from the modulated unique frequency tone when the optical signal is received by the first communication terminal.

Determining the signal strength of the modulated unique frequency tone may include filtering the mixed output signal to extract a direct-current component from the mixed output signal, and determining the signal strength of the modulated unique frequency tone based on a value of the direct-current component extracted from the mixed output signal. Adjusting the optical head of the first communication terminal may establish the acquisition and optical beam pointing with the second communication terminal by increasing the signal strength of the modulated unique frequency tone of the optical signal received from the second communication terminal.

After optical beam acquisition and pointing is established between the first communication terminal and the second communication terminal, the method may include transmitting a first telemetry signal from the first communication terminal to the second communication terminal through the optical link. The first telemetry signal may inform the second communication terminal to reduce a divergence angle of the optical signal during subsequent transmissions to the first communication terminal through the optical link. The method may also include receiving, at the first communication terminal, a second telemetry signal from second communication terminal through the optical link. The second telemetry signal may inform the first communication terminal to reduce a divergence angle of optical beams transmissions to the second communication terminal through the optical link. The first telemetry signal may additionally or alternatively inform the second communication terminal to redirect a transmitting angle of the optical signal during subsequent transmissions to the first communication terminal through the optical link. By redirecting the transmitting angle of the optical signal during subsequent transmissions to the first communication terminal, a received data signal and/or a received modulated unique frequency tone at the first communication terminal may be maximized. Similarly, the second telemetry signal may additionally or alternatively inform the second communication terminal to redirect a transmitting angle of subsequent optical beam transmissions to the second communication terminal through the optical link. By redirecting the transmitting angle of the subsequent optical beam transmissions to the second communication terminal, a received data signal and/or a received modulated unique frequency tone at the second communication terminal may be maximized.

The method may also include determining, by the controller hardware, a received power of the optical signal received from the second communication terminal at each one of three or more photodetectors associated with receiving optics of the first communication terminal, and determining, by the control hardware, whether the received power at each of the photodetectors is balanced. When the received power at the photodetectors is unbalanced, the method may include adjusting, by the control hardware, the pointing of the receiving optics of the first communication terminal until the receiving optics are centered with the optical signal received from the second communication terminal. The first communication terminal and the second communication terminal may be stationary optical terminals.

Another aspect of the disclosure provides a first communication terminal. The communication terminal includes an optical head including transmitter optics and receiving optics, control hardware in communication with the optical head, and memory hardware in communication with the control hardware. The receiving optics are configured to receive an optical signal from a second communication terminal through a free space optical link. The received optical signal includes a modulated unique frequency tone. The memory hardware stores instructions, that when executed on the control hardware, cause the control hardware to perform operations. The operations include: mixing the modulated unique frequency tone with a reference signal to provide a mixed output signal; determining a signal strength of the modulated unique frequency tone based on the mixed output signal; and adjusting an optical head of the first communication terminal to establish acquisition and optical beam pointing with the second communication terminal based on the signal strength of the modulated unique frequency tone received from the second communication terminal. The reference signal includes a same frequency as the modulated unique frequency tone.

Implementations of the disclosure may include one or more of the following optional features. In some implementations, the second communication terminal combines a data signal including one or more data packets and a beacon signal modulated at the unique frequency tone onto a multiplexed optical carrier comprising the optical signal for transmission to the first communication terminal. The second communication terminal may use one of a wavelength division multiplexer or a polarization multiplexer to combine the data signal and the beacon signal onto the multiplexed optical carrier.

In some examples, when the first communication terminal receives the optical signal from the second communication terminal, the operations include de-multiplexing the received optical signal into the data signal and the beacon signal. In these examples, mixing the modulated unique frequency tone includes mixing the received beacon signal with the reference signal from a local oscillator of the first communication terminal to provide the mixed output signal. The second communication terminal may combine the modulated unique frequency tone onto a modulated data signal containing a stream of data packets to produce the optical signal for transmission to the first communication terminal. The modulated unique frequency tone may include a lower frequency than a frequency of the modulated data signal. The modulated unique frequency tone may include a smaller power modulation depth than the modulated data signal.

When the first communication terminal receives the optical signal from the second communication terminal, the operations include splitting the optical signal into the modulated data signal and the modulated unique frequency tone, and encoding the stream of data packets on the modulated data signal. Mixing the modulated unique frequency tone may include mixing the modulated unique frequency tone with the reference signal from a local oscillator of the first communication terminal to provide the mixed output signal. Mixing the modulated unique frequency tone with the reference signal may eliminate noise from the modulated unique frequency tone when the optical signal is received by the first communication terminal.

In some implementations, determining the signal strength of the modulated unique frequency tone includes filtering the mixed output signal to extract a direct-current component from the mixed output signal and determining the signal strength of the modulated unique frequency tone based on a value of the direct-current component extracted from the mixed output signal. Adjusting the optical head of the first communication terminal may establish the acquisition and optical beam pointing with the second communication terminal by increasing the signal strength of the modulated unique frequency tone of the optical signal received from the second communication terminal.

In some examples, the operations include, after optical beam acquisition and pointing is established between the first communication terminal and the second communication terminal, transmitting a first telemetry signal from the first communication terminal to the second communication terminal through the optical link and receiving a second telemetry signal at the first communication terminal from second communication terminal through the optical link. The first telemetry signal may inform the second communication terminal to reduce a divergence angle of the optical signal during subsequent transmissions to the first communication terminal through the optical link. The second telemetry signal may inform the first communication terminal to reduce a divergence angle of optical beams transmissions to the second communication terminal through the optical link. The first telemetry signal may additionally or alternatively inform the second communication terminal to redirect a transmitting angle of the optical signal during subsequent transmissions to the first communication terminal through the optical link. By redirecting the transmitting angle of the optical signal during subsequent transmissions to the first communication terminal, a received data signal and/or a received modulated unique frequency tone at the first communication terminal may be maximized. Similarly, the second telemetry signal may additionally or alternatively inform the second communication terminal to redirect a transmitting angle of subsequent optical beam transmissions to the second communication terminal through the optical link. By redirecting the transmitting angle of the subsequent optical beam transmissions to the second communication terminal, a received data signal and/or a received modulated unique frequency tone at the second communication terminal may be maximized.

The operations may also include determining a received power of the optical signal received from the second communication terminal at each one of three or more photodetectors associated with receiving optics of the first communication terminal, and determining whether the received power at each of the photodetectors is balanced. When the received power at the photodetectors is unbalanced, the operations include adjusting the pointing of the receiving optics of the first communication terminal until the receiving optics are centered with the optical signal received from the second communication terminal. The first communication terminal and the second communication terminal may be stationary optical terminals.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
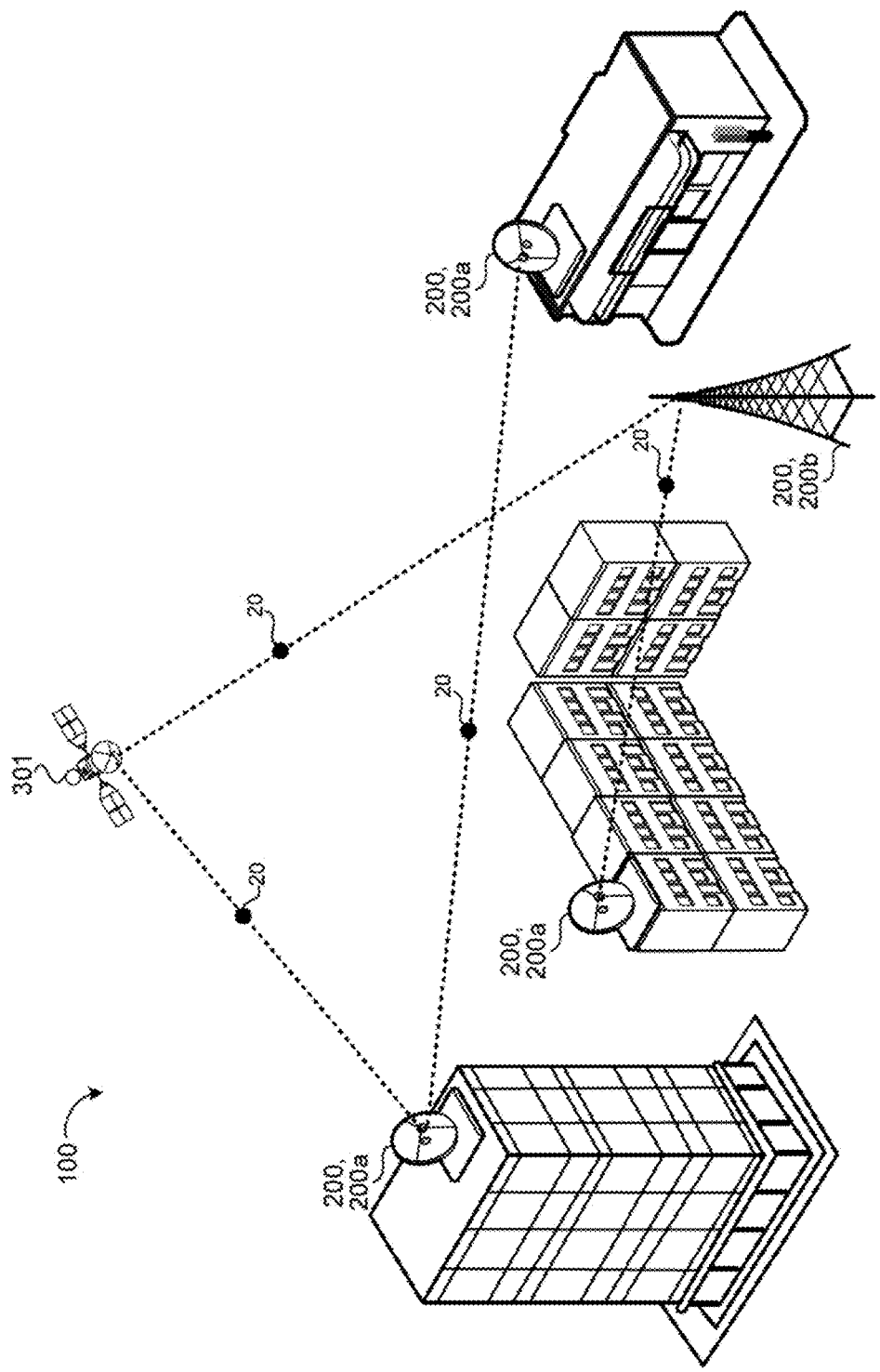
FIG. 1 is a schematic view of an example communication system.

Referring to FIG. 1, in some implementations, a global-scale communication system 100 includes stationary communication terminals 200 (e.g., destination ground stations 200a and source ground stations 200b) and satellites 301. The stationary communication terminals 200 may communicate with one another, and in some examples, the stationary communication terminals 200 also operate as linking-gateways between two or more satellites 301. The destination ground stations 200a may be user terminals (e.g., mobile devices, residential WiFi devices, home networks, etc.) and the source ground stations 200b may be connected to one or more service providers. The stationary communication terminals 200 may receive a communication 20 from one of the satellites 301 and reroute the communication 20 to another communication terminal 200. The system 100 may also include high altitude platforms (HAPs) that include aerial communication devices that operate at high altitudes (e.g., 17-22 km). For instance, HAPs may be released into the earth's atmosphere, e.g., by an air craft, or flown to the desired altitude. The satellite 301 may be in Low Earth Orbit (LEO), Medium Earth Orbit (MEO), or High Earth Orbit (HEO), including Geosynchronous Earth Orbit (GEO).

Figure 2B:
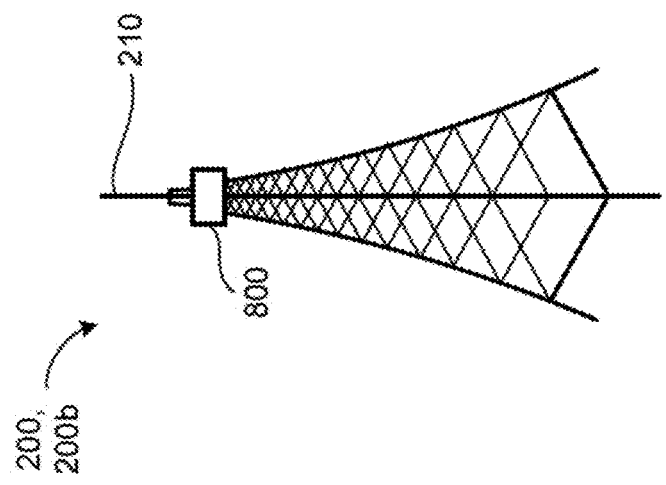
FIGS. 2A and 2B are perspective views of example stationary communication terminals.
Figure 2A:
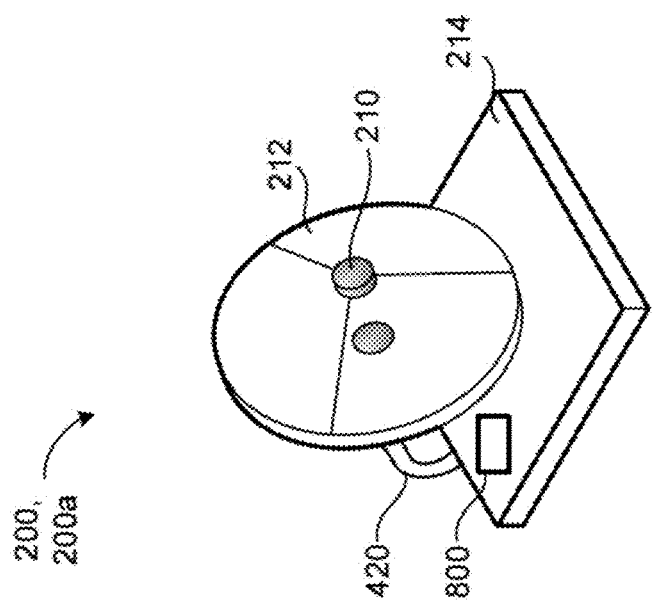
Figure 3:
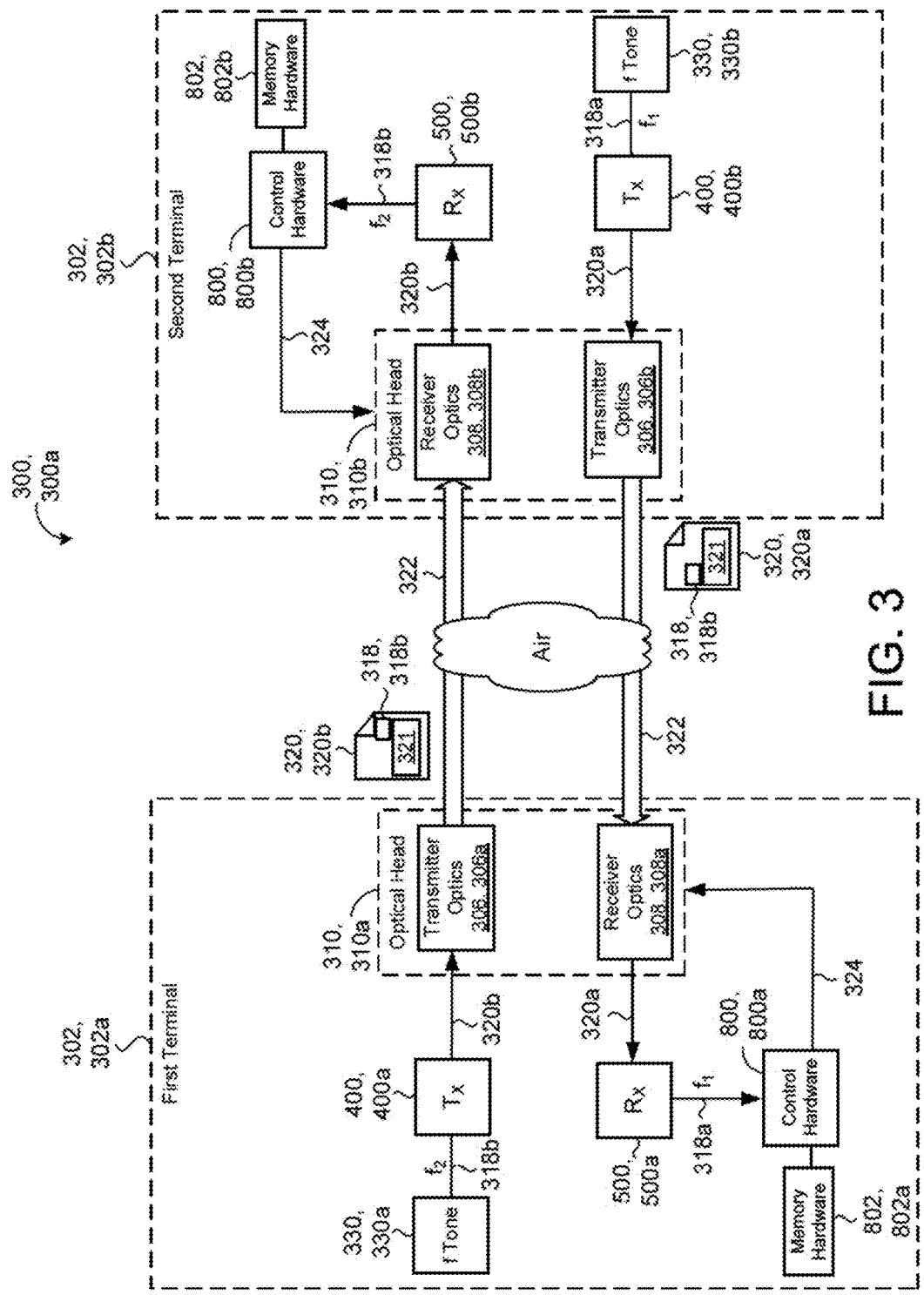
FIG. 3 is a schematic view of an example communication system providing optical signals through a free space optical link between a first communication terminal and a second communication terminal.

Referring to FIGS. 2A and 2B, in some implementations, the communication terminal 200 includes a transceiver 210 that receives the communication 20 from another communication terminal 200, a HAP, or the satellite 301 and transmits the communication 20 to another communication terminal 200, HAP, or satellite 301. The communication terminal 200 may include control hardware 800 that processes the received communication 20 and establishes acquisition and tracking with the other communication terminal 200 or satellite 301. In some implementations, two stationary communication terminals 200 are capable of communicating with one another by transmitting optical signals 320 (FIG. 3) through a free space optical link 322 (FIG. 3). The stationary communication terminals 200 may establish acquisition and tracking with one another without using position sensors, fast steering mirrors, and/or fast gimbals that are employed by sophisticated acquisition and tracking systems required by communication terminals that move fast and relative to one another.

FIG. 2A illustrates an example destination ground station 200a that includes a base 214 and a reflector 212 supported by the base 214. The ground station 200a also includes a transceiver 210, such as transmitter optics 306 (FIG. 3) and receiving optics 308 (FIG. 3), and control hardware 800 in communication with the transceiver 210. The control hardware 800 executes algorithms to determine a signal strength 415 (FIG. 4) of a modulated unique frequency tone 318 (FIG. 3) included within an optical signal 320 received from another communication terminal 200 and thereafter adjust the transceiver 210 to establish acquisition and optical beam pointing with the other terminal 200 based on the signal strength 415 of the modulated unique frequency tone 318 received from the other terminal 200. In some examples, the control hardware 800 is associated with pointing steering hardware 420 (e.g., a gimbal) for adjusting the transceiver 210 to point toward the other terminal 200. The base 214 may mount the destination ground station 200a on a building or other venue and allow the destination ground station 200a to remain stationary with respect to the building.

FIG. 2B illustrates an example source ground station 200b that also includes the transceiver 212 and control hardware 800 for determining signal strengths of modulated unique frequency tones 318 included within optical signals 320 received from other communication terminals 200. The control hardware 800 of the source ground station 200b may also adjust the transceiver 210 to establish acquisition and optical beam pointing with the other terminals 200 based on the signal strength of the modulated unique frequency tone 318 received from the other terminal 200.

Referring to FIG. 3, in some implementations, a communication system 300 300a provides optical signals 320, 320a-b between a first communication terminal 302a (hereinafter 'first terminal 302a') and a second communication terminal 302b (hereinafter 'second terminal 302b') through the free space optical link 322. The optical signals 320 may include data 321, such as internet packets, being routed through the global-scale communication system 100. The terminals 302a, 302b may be stationary terminals mounted on buildings or other non-moving or slow moving structures that do not require sophisticated acquisition and optical beam pointing systems required by fast moving terminals, such as HAPs and satellites. Each terminal 302a, 302b may include a frequency tone module 330, 330a-b, a transmitter module 400, 400a-b, an optical head 310, 310a-b, a receiver module 500, 500a-b, the control hardware 800, 800a-b, and memory hardware 802, 802a-b. The optical head 310 includes transmitter optics 306, 306a-b and receiver optics 308, 308a-b. The memory hardware 802 stores information, such as instructions executable by the control hardware 800, non-transitorily at the control hardware 800. The memory hardware 802 may be a computer-readable medium, a volatile memory unit(s), or non-volatile memory unit(s). The memory hardware 802 may be physical devices used to store programs (e.g., sequences of instructions) or data (e.g., program state information) on a temporary or permanent basis for use by the control hardware 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes. The control hardware 800 can be, for example, a processor executing computer-readable instructions stored in the memory hardware 802, a field programmable gate array (FGPA), a digital signal processor (DSP), or any other suitable circuitry.

In some implementations, the terminals 302 establish acquisition and optical beam pointing with one another based upon signal strengths 415 of modulated unique frequency tones 318 included within optical signals 320 communicated between the terminals 302 via the optical link 322. For instance, each optical signal 320 received by a receiving one of the terminals 302 may include a modulated unique frequency tone 318 associated with the transmitting one of the terminals 302. The receiving terminal 302 may determine a signal strength 415 of the modulated unique frequency tone 318 and then adjust the optical head 310 to increase the signal strength 415 of the modulated unique frequency tone 318, thereby establishing acquisition and optical beam pointing with the transmitting one of the terminals 302. Accordingly, the receiving terminal 302 may search the optical space to listen for the modulated unique frequency tone 318 transmitted by the transmitting terminal 302 and adjust the optical head 310 to maximize the signal strength of the modulated unique frequency tone 318.

The transmitter optics 306 transmit the optical signals 320 and the receiver optics 308 receive the optical signals 320 through the optical link 322. For instance, the transmitter optics 306b at the second terminal 302b may transmit a first optical signal 320a through the optical link 322 to the receiver optics 308a at the first terminal 302a. Similarly, the transmitter optics 306a at the first terminal 302a may transmit a second optical signal 320b through the optical link 322 to the receiver optics 308b at the second terminal 302b. In some implementations, the transmitter optics 306 includes an adjustable lens set to adjust a divergence angle of the optical signal 320 when transmitting the optical signal 320. For instance, the optical signal 320 may include a highly divergent pilot beam for transmission prior to establishing acquisition and optical beam pointing between the terminals 302. Once the acquisition and optical beam pointing is established, the transmitter optics 306 may reduce the divergence angle associated with the pilot beam to optimize the optical beam pointing between the terminals 302.

The receiver optics 308 may provide the received optical signal 320 to the receiver module 500. The receiver optics 308 and the receiver module 500 may include, but are not limited to, a de-multiplexer, an optical pre-amplifier, photodiodes, the photo receiver, transimpedance amplifiers, clock/phase recovery circuits, decision circuits, and/or forward error correction circuits to separate (e.g., de-multiplex or split) the optical signals 320 into the modulated unique frequency tone 318 and electrical binary bits to interpret the data 321. The control hardware 800 may be in communication with the receiver module 500 and the receiver optics 308. In some implementations, the control hardware 800 determines the signal strength 415 of the modulated unique frequency tone 318 received within the optical signal 320 last received by the associated receiver optics 308 and provides pointing adjustments 324 to the receiver optics 308 and/or the transmitter optics 306 of the optical head 310 to establish acquisition and optical beam pointing with the other terminal 302. Accordingly, the control hardware 800 may provide closed loop control for the optical head 310 to adjust optical beam pointing at the associated terminal 302 based upon the signal strength 415 for the modulated unique frequency tone received over the optical link 322 from the other terminal 302.

The frequency tone module 330 may provide the modulated unique frequency tone 318 to the transmitter module 400 and the transmitter module 400 may combine the unique frequency tone 318 and the data 321 to produce the optical signal 320 for transmission by the transmitter optics 306 at the associated terminal 302 to the other terminal 302. For instance, the transmitter module 400b at the second terminal 400b may produce a first optical signal 320a by combining data 321 and a unique frequency tone f1 associated with the second terminal 302b from the frequency tone module 330b at the second terminal 302b. Similarly, the transmitter module 400a at the first terminal 400a may produce a second optical signal 320b by combining data 321 and a unique frequency tone f2 associated with the first terminal 302a from the frequency tone module 330a at the first terminal 302a. The unique frequency tones f1 and f2 associated with the respective terminals 302 may be the same or different. In some examples, the terminals 302 periodically change the values of the modulated unique frequency tones f1 and f2 for security and/or to avoid pointing to a wrong source having a same frequency tone.

In some implementations, the transmitter optics 306b at the second terminal 302b transmit the first optical signal 320a over the optical link 322 to the receiver optics 308a at the first terminal 302a. Upon receiving the first optical signal 320a, the receiver optics 308a at the first terminal 302a may provide the optical signal 320a, or information associated with optical signal 320a, to the receiver module 500a for separating the modulated unique frequency tone f1 318a and the data 321 from the first optical signal 320a. The control module 800a at the first terminal 302a determines the signal strength 415 of the modulated unique frequency tone f1 318a and provides pointing adjustments 324 to the optical head 310a to increase the signal strength 415 of the modulated unique frequency tone f1 318a received from the second terminal 302b to thereby establish acquisition and optical beam pointing with the second terminal 302b. In some examples, the control hardware 800a determines the signal strength 415 of the modulated unique frequency tone f1 318a associated with the second terminal 302b by extracting a direct current (DC) component 335 (FIG. 4) from the modulated unique frequency tone f1 318a which is proportional to the signal strength 415. In some implementations, the pointing adjustments 324 direct a gimbal to steer the entire optical head 310a, or a beam steering device, such as a siderostat or steering mirror, to steer the optical beams at the receiver optics 308a and/or the transmitter optics 306a. In some scenarios, the control hardware 800 is in communication with an optical amplifier downstream of the transmitter module 400 to adjust an output amplification of a subsequently transmitted optical signal 320 based upon the received modulated unique frequency tone 318.

Similar to the transmitter optics 306b at the second terminal 302b, the transmitter optics 306a at the first terminal 302a may transmit the second optical signal 320b over the optical link 322 to the receiver optics 308b at the second terminal 302b. Upon receiving the second optical signal 320b, the receiver optics 308b at the second terminal 302b provides the optical signal 320b, or information associated with optical signal 320b, to the receiver module 500b for separating the modulated unique frequency tone f2 318b and the data 321 from the second optical signal 320b. The control module 800b at the second terminal 302b determines the signal strength 415 (FIG. 4) of the modulated unique frequency tone f2 318b and provides pointing adjustments 324 to the optical head 310b to increase the signal strength 415 of the modulated unique frequency tone f2 318b received from the first terminal 302a to thereby establish acquisition and optical beam pointing with the first terminal 302a.

Figure 4:
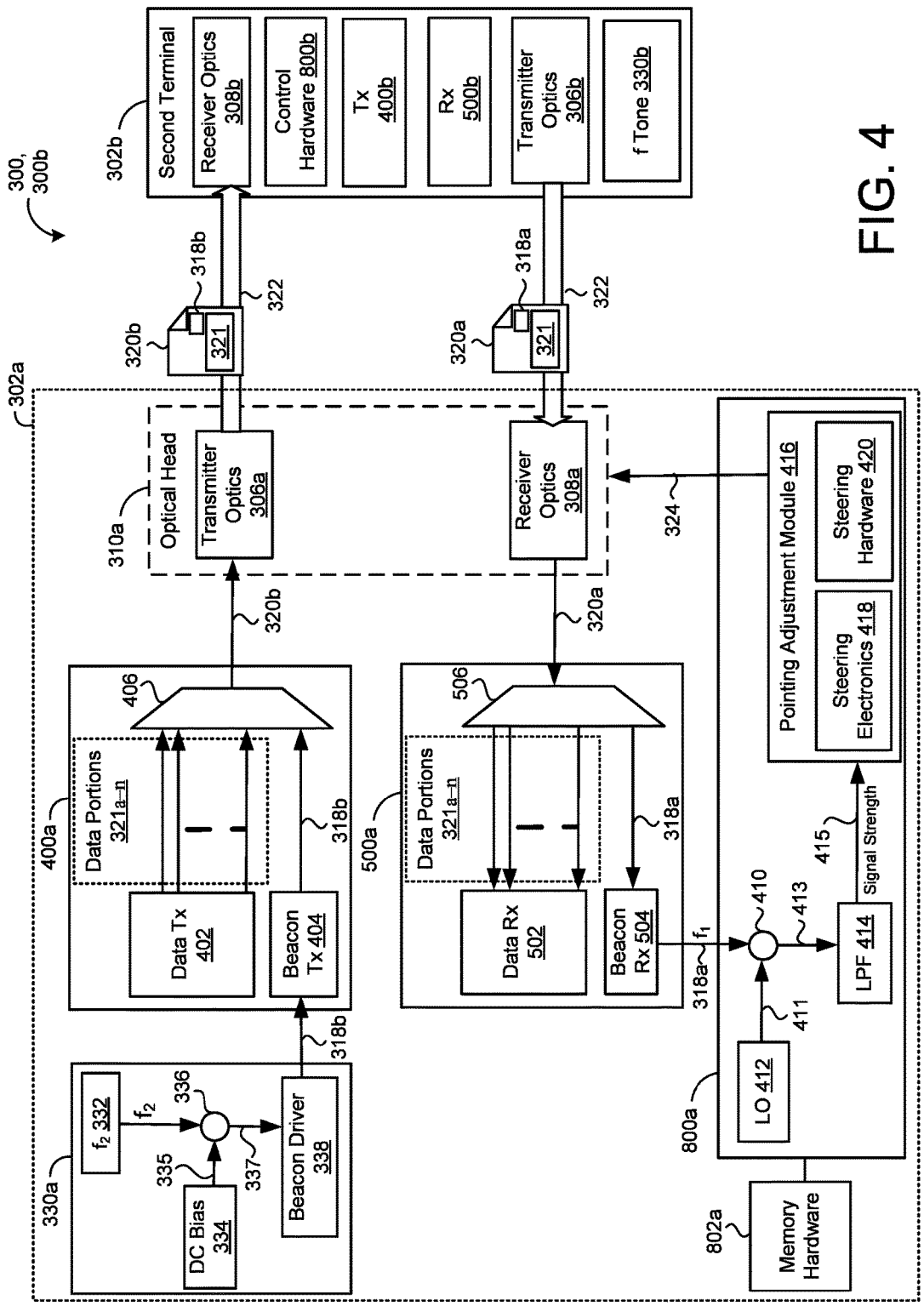
FIG. 4 is a schematic view of an example communication system providing optical signals each including a beacon signal modulated at a unique frequency tone through a free space optical link between a first communication terminal and a second communication terminal.

Referring to FIG. 4, in some implementations, a communications system 300, 300b provides the optical signals 320 between the first terminal 302a and the second terminal 302b through the free space optical link 322. A frequency module 332, a DC bias module 334, a combiner 336, and a beacon driver 338 are associated with each of the frequency tone modules 330a, 330b.

The combiner 336 receives the associated unique frequency tone f1 or f2 from the frequency module 332 and a DC component 335 from the DC bias module 334 to produce an output signal 337 the beacon driver 338 uses to modulate a beacon signal 318 at the associated unique frequency tone f1 or f2. The beacon driver 338 provides the beacon signal 318 modulated at the unique frequency tone to the transmitter module 400. For example, the beacon driver 338 at the first terminal 302a provides the beacon signal 318b modulated at the unique frequency tone f2 to the transmitter module 400b.

In some examples, one or more data transmitters 402, a beacon transmitter 404, and a multiplexer 406 are associated with each of the transmitter modules 400a, 400b. Each data transmitter 402 may include a directly modulated laser diode at any suitable wavelength or a laser diode followed by a modulator. The beacon transmitter 404 may also include a laser diode. In some implementations, each data transmitter transmits portions of the data 321a-n (e.g., data packets) to the multiplexer 406 while the beacon transmitter 404 transmits the beacon signal 318 modulated at the unique frequency tone f1, f2 provided from the beacon driver 338 to the multiplexer 406. In these examples, the multiplexer 406 combines the data signal 321 including the one or more data packets 321a-n and the beacon signal 318 modulated at the unique frequency tone f1, f2 onto a multiplexed optical carrier that includes the optical signal 320 for transmission to the other terminal 302. The multiplexer 406 may include a wavelength division multiplexer (WDM) or a polarization multiplexer. In some examples, the transmitters 402 include optical transmitters that transmit optical signals including associated portions of the data 321a-n. The multiplexer 406 multiplexes the data portions 321a-n and the beacon signal 318 to propagate the optical signal 320 with the data 321 and the beacon signal 318. In some examples, the multiplexer 406 provides the optical signal 320 with a dedicated channel for transmission over the optical link 322. The multiplexer 406 is followed by an amplifier for adjusting an output amplification of the optical signal 320 before transmission from the transmitter optics 306.

FIG. 4 shows the transmitter optics 306b at the second terminal 302b transmitting a first optical signal 320a propagated with the data 321 and the beacon signal 318a modulated at the unique frequency tone f1 through the optical link 322 to the receiver optics 308a at the first terminal 302a. Similarly, the transmitter optics 306a at the first terminal 302a transmit a second optical signal 320b propagated with the data 321 and the beacon signal 318b modulated at the unique frequency tone f2 through the optical link 322 to the receiver optics 308b at the second terminal 302b.

In some examples, a data receiver 502, a beacon receiver 504, and a de-multiplexer 506 are associated with each of the receiver modules 500a, 500b. Upon the receiving optics 308 receiving an optical signal 320 over the optical link 322, the de-multiplexer 506 de-multiplexes the received optical signal 320 into the data signal 321 and the beacon signal 318 modulated at the unique frequency tone f1, f2. In some examples, the de-multiplexer 506 de-multiplexes the data signal 321 into the corresponding data portions 321a-n and provides the data portions 321a-n to the data receiver 502 for conversion into electrical binary bits to interpret the data 321. On the other hand, the beacon receiver 504 receives the beacon signal 318 and provides the beacon signal 318 to the control hardware 800 for determining a signal strength 415 of the received beacon signal 318 modulated at the unique frequency tone f1, f2. For instance, the de-multiplexer 506 at the first terminal 302a may de-multiplex the received first optical signal 320a from the second terminal 302b into the data signal 321 and the beacon signal 318a modulated at the unique frequency tone f1 and the beacon receiver 504 may provide the beacon signal 318a to the control hardware 800a at the first terminal 302a.

In some implementations, a mixer 410, a local oscillator (LO) 412, a low pass filter (LPF) 414, and a pointing adjustment module 416 are associated with each control hardware 800a, 800b. The mixer 410 mixes the received beacon signal 318 from the beacon receiver 504 with a reference signal 411 from the LO 412 to provide a mixed output signal 413. In some examples, the reference signal 411 includes a same frequency as the modulated unique frequency tone associated with the received beacon signal 318 to eliminate noise when the optical signal 320 containing the beacon signal 318 is received by the associated terminal 302. For instance, the LO 412 of the control hardware 800a at the first terminal 302a provides a reference signal 411 including the same frequency as the modulated unique frequency tone f1 of the received beacon signal 318a from the second terminal 302b. Accordingly, the mixer 410, LO 412, and the LPF 414 cooperate to form a phase-locked loop system that produces the mixed output signal 413 having the same phase/frequency as the modulated unique frequency tone f1 or f2 of the beacon signal 318. Advantageously, the mixed output signal 413 is operative to recover the unique frequency tone f1 or f2 associated with the received beacon signal 318 which may be impacted due to noise over the optical link 322.

The mixer 410 provides the mixed output signal 413 to the LPF 414 and the LPF 414 filters the mixed output signal 413 to extract the DC component 335 therefrom. In some examples, the value of the DC component 335 associated with the received beacon signal 318 is proportional to the signal strength 415 of the received beacon signal. Accordingly, the control hardware 800 may determine the signal strength 415 of the beacon signal 318 modulated at the unique frequency tone f1, f2 based on a value of the DC component 335 extracted from the mixed output signal 413. In addition to including the DC component 335, the mixed output signal 413 also includes second harmonic components and other higher order harmonic components. Accordingly, the mixer 410 may also provide the mixed output signal 413 to a second harmonic filter (not shown), or high order harmonic filter, to extract a second harmonic signal therefrom. As with the DC component 334, a value of the second harmonic signal (or higher order harmonic signal) is proportional to the signal strength 415 of the received beacon signal.

Using the signal strength 415 determined from the value of the DC component 335 associated with the received beacon signal 318, the pointing adjustment module 416 provides pointing adjustments 324 to the optical head 310 to increase the signal strength 415 of the received beacon signal 318 modulated at the unique frequency tone received to thereby establish acquisition and optical beam pointing with the transmitting terminal 302. For instance, the pointing adjustment module 416 of the control hardware 800a at the first terminal 302a may provide pointing adjustments 324 to the optical head 310a to increase the signal strength 415 of the beacon signal 318a modulated at the unique frequency tone f1 received from the second terminal 302b to thereby establish acquisition and optical beam pointing with the second terminal 302b in a closed-loop manner. The pointing adjustment module 416 at each of the terminals 302a, 302b may include steering electronics 418 and/or steering hardware 420. In some examples, the steering hardware 420 includes a gimbal to steer the entire optical head 310 at the corresponding terminal 302. In other examples, the steering hardware 420 includes a beam steering device, such as a siderostat or a steering mirror, to steer the optical beams. Accordingly, the steering electronics 418 and/or steering hardware 420 may provide closed loop control to maximize the determined signal strength 415 associated with the received beacon signal 318.

Figure 5:
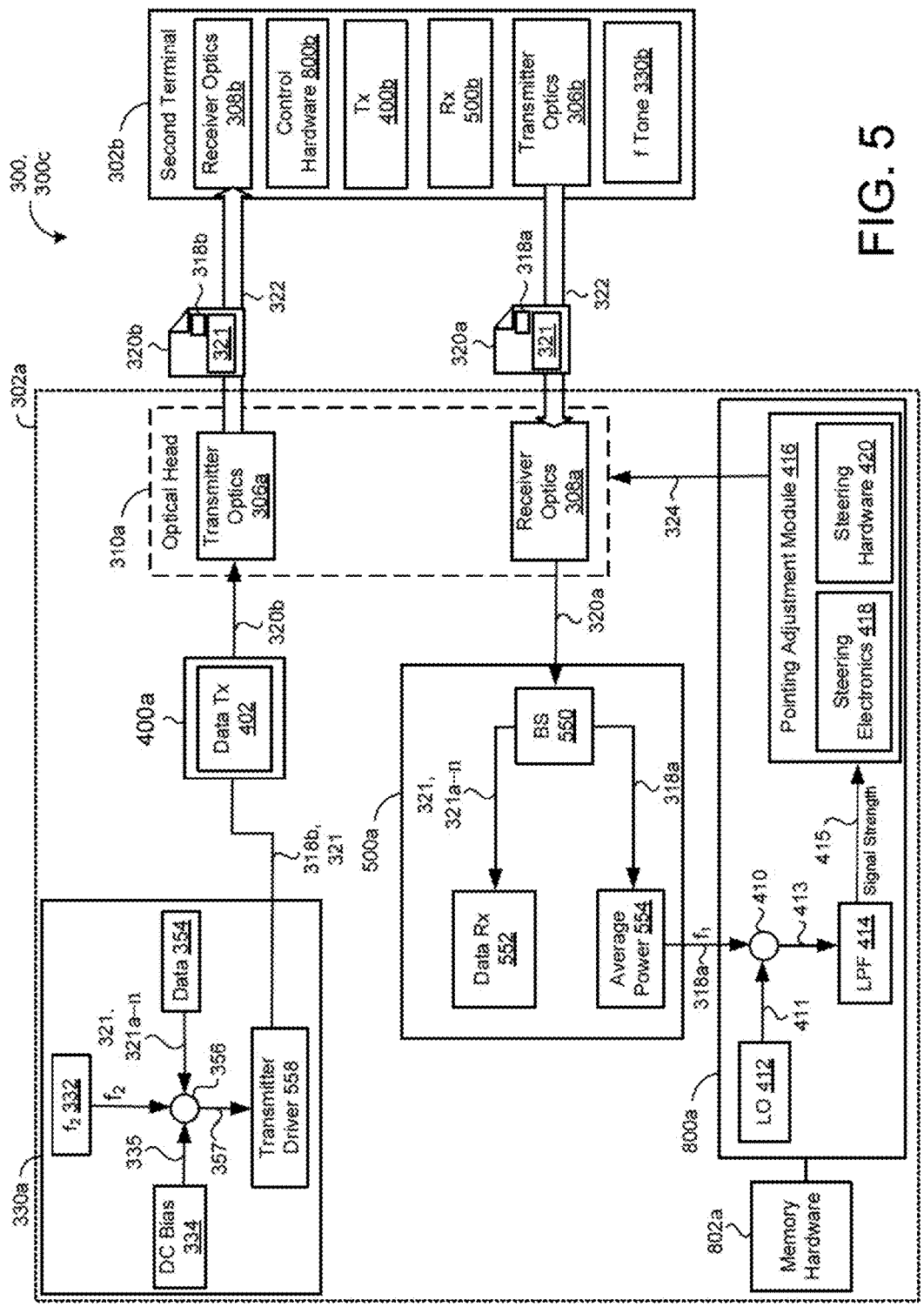
FIG. 5 is a schematic view of an example communication system providing optical signals each including a modulated unique frequency tone through a free space optical link between a first communication terminal and a second communication terminal.

Referring to FIG. 5, in some implementations, a communications system 300, 300c provides the optical signals 320 between the first terminal 302a and the second terminal 302b through the free space optical link 322. In some implementations, the frequency module 332, the DC bias module 334, a high speed data module 354, a combiner 356, and a transmitter driver 558 are associated with each of the frequency tone modules 330a, 330b. Whereas the combiner 336 of the communications system 300b of FIG. 4 receives the associated unique frequency tone f1 or f2 and the DC component 335 to produce the output signal 337 that the beacon driver 338 uses to modulate the beacon signal 318 at the associated unique frequency tone f1 or f2, the combiner 356 of the communications system 300c receives high speed data 321 from the high speed data module 354, the associated unique frequency tone f1 or f2, and the DC component 335 to produce an output signal 357 that the transmitter driver 558 uses to add the associated unique frequency tone f1 or f2 as a power modulation 318 on top of the high speed data 321.

In some examples, the high speed data 321 includes a high speed data stream of data packets 321a-n and the transmitter driver 558 adds the associated unique frequency tone f1 or f2 as a power modulation 318 on top of the high speed data stream of data packets 321a-n for use by the data transmitter 402 of the transmitter module 400. For instance, the transmitter driver 558 at the first terminal 302a may add the unique frequency tone f2 as a power modulation 318b on top of the high speed data 321 for use by the data transmitter 402 of the transmitter module 400a. In some examples, the power modulation 318 at the associated unique frequency tone f1 or f2 is lower than a rate of the high speed data 321. Additionally, the depth of the power modulation 318 at the associated unique frequency tone f1 or f2 is relatively small so that the power modulation 318 does not cause significant negative impacts to decision circuits at the receiving module 500 when received by the receiving terminal 302.

In some implementations, the data transmitter 402 is a directly modulated laser diode operative to carry the high speed data 321 with the associated unique frequency tone f1 or f2 added to the data 321 by modulating the DC component 335 at a small depth. When the high speed data 321 is encoded by an external modulator, the associated unique frequency tone f1 or f2 is added on top of the high speed data 321 by modulating a DC bias voltage or current of the external modulator at a small depth. Accordingly, the data transmitter 402 transmits the optical signal 320 including the high speed data 321 with the associated unique frequency tone f1 or f2 added to the data 321 as the small depth power modulation 318 for transmission to the other terminal 302. FIG. 5 shows the transmitter optics 306b at the second terminal 302b transmitting a first optical signal 320a including the unique frequency tone f1 added as a small depth power modulation 318a on top of the high speed data 321 through the optical link 322 to the receiver optics 308a at the first terminal 302a.

In some examples, a beam splitter (BS) 550, a high speed data receiver 552, and an average power module 554 are associated with each of the receiver modules 500a, 500b. Upon the receiving optics 308 receiving an optical signal 320 over the optical link 322, the BS 550 directs the high speed data 321 from the received optical signal 320 to the high speed data receiver 552 that includes electronics for converting the high speed data 321 into electrical binary bits for interpreting the data 321. Concurrently, the average power module 554 detects the average power of the small depth power modulation 318 and the control hardware 800 determines the signal strength 415 of the small depth power modulation 318 at the associated unique frequency tone f1 or f2 for providing pointing adjustments 324 to the optical head 310 of the associated terminal 302. In some examples, the BS 550 detects higher rates or speeds associated with the high speed data 321 of the received optical signal 320 to separate the data 321 from the small depth power modulation 318 associated with a lower rate or frequency. For instance, the average power module 554 at the first terminal 302a may detect the average power of the small depth power modulation 318a at the unique frequency tone f1 and provide the small depth power modulation 318a to the control hardware 800a.

As with the control hardware 800a, 800b of the example communications system 300b of FIG. 4, the control hardware 800a, 800b of the example communication system 300c of FIG. 5 each include the mixer 410, the LO 412, and the LPF 414 to provide the phase-locked loop system for recovering the associated unique frequency tone f1 or f2 added to the data 321 of the received optical signal 320 as the small depth power modulation 318. Thus, the mixer 410 mixes the received small depth power modulation 318 with the reference signal 411 from the LO 412 to provide the mixed output signal 413. In some examples, the LO 412 of the control hardware 800a at the first terminal 302a provides the reference signal 411 including the same frequency as the unique frequency tone f1 of the received small depth power modulation 318a from the second terminal 302b to eliminate noise when the first optical signal 320a containing the small depth power modulation 318a is received by the first terminal 302a. Thereafter, the LPF 414 receives and filters the mixed output signal 413 to extract the DC component 335 to determine the signal strength 415 of the small depth power modulation 318a at the unique frequency tone f1. The value of the DC component 335 extracted from the mixed output signal 413 may be proportional to the signal strength 415 of the received small depth power modulation 318a. Accordingly, the control hardware 800 determines the signal strength 415 of the small depth power modulation 318a at the unique frequency tone f1, f2 based on a value of the DC component 335 extracted from the mixed output signal 413. In addition to including the DC component 335, the mixed output signal 413 also includes second harmonic components and other higher order harmonic components. Accordingly, the mixer 410 may also provide the mixed output signal 413 to a second harmonic filter (not shown), or high order harmonic filter, to extract a second harmonic signal therefrom. As with the DC component 334, a value of the second harmonic signal (or higher order harmonic signal) is proportional to the signal strength 415 of the small depth power modulation 318a at the unique frequency tone f1, f2.

Using the signal strength 415 determined from the value of the DC component 335 associated with the received optical signal 320, the pointing adjustment module 416 provides the pointing adjustments 324 to the optical head 310 to increase the signal strength 415 of the small depth power modulation 318 at the unique frequency tone received through the optical link 322 to thereby establish acquisition and optical beam pointing with the transmitting terminal 302. For instance, the pointing adjustment module 416 of the control hardware 800a at the first terminal 302a may provide pointing adjustments 324 to the optical head 310a to increase the signal strength 415 of the small depth power modulation 318a at the unique frequency tone f1 received from the second terminal 302b. The pointing adjustment module 416 at each of the terminals 302a, 302b may include steering electronics 418 and/or steering hardware 420. The steering electronics 418 and/or steering hardware 420 provide closed loop control to maximize the determined signal strength 415 of the small depth power modulation 318.

Figure 6:
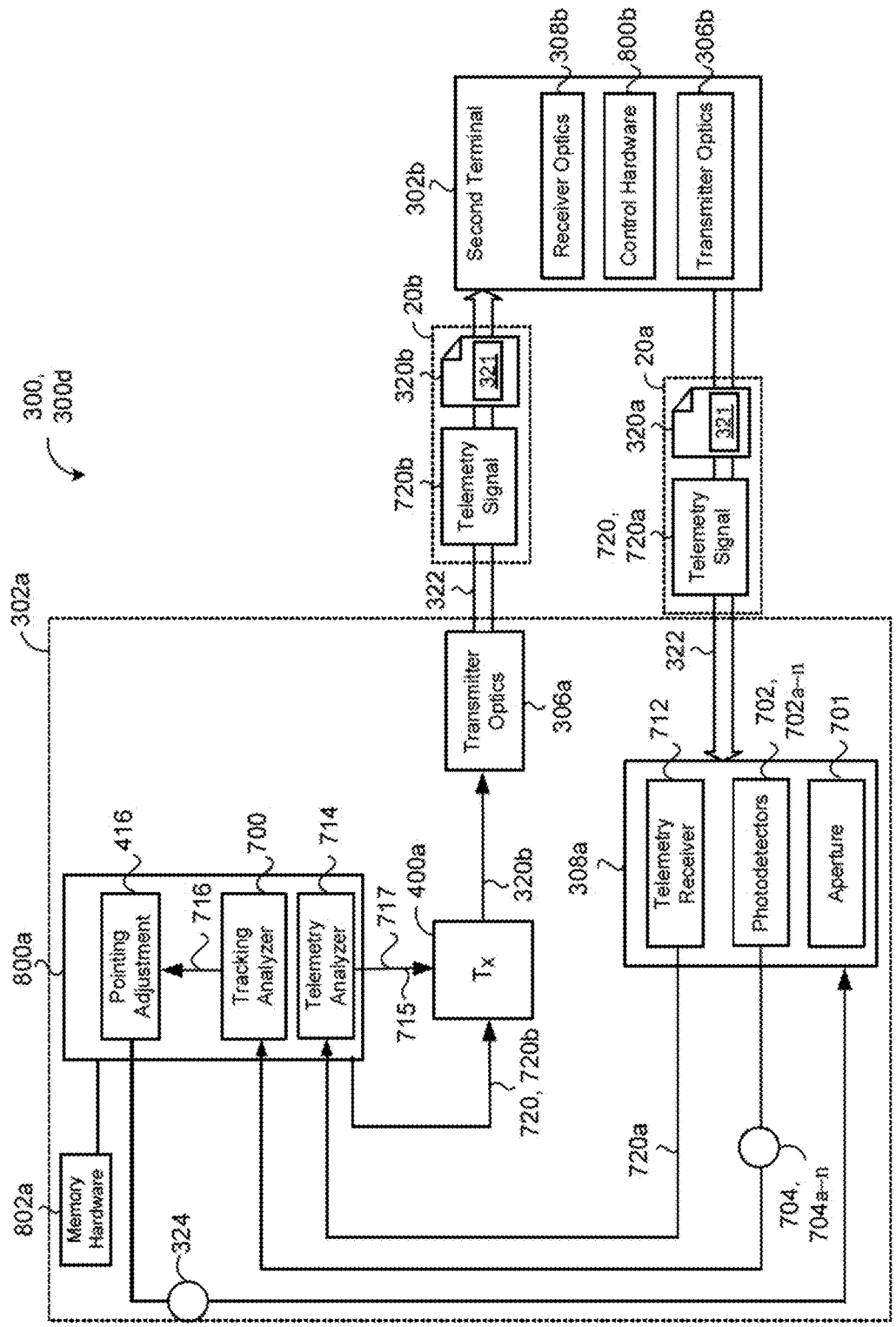
FIG. 6 is a schematic view of an example communication system providing telemetry signals through a free space optical link between a first communication terminal and a second communication terminal.

Referring to FIG. 6, in some implementations, a communications system 300, 300d provides optimization and continuous tracking of optical beam pointing between the first terminal 302a and the second terminal 302b after the acquisition and optical beam pointing is established between the terminals 302a and 302b. The acquisition and optical beam pointing between the terminals 302a and 302b may be established using any of the communications systems 300a-c described above with reference to FIGS. 3-6. In some implementations, the transmitter optics 306 includes an adjustable lens set to adjust a divergence angle of the optical signal 320 when transmitting the optical signal 320. For instance, the optical signal 320 may include a highly divergent pilot beam for transmission prior to establishing acquisition and optical beam pointing between the terminals 302, and once the acquisition and optical beam pointing is established, the transmitter optics 306 may reduce the divergence angle associated with the pilot beam to optimize the optical beam pointing between the terminals 302. As used herein, the divergence angle of the "pilot beam" may refer to the divergence angle of the beacon signal 318 of the communications system 300b of FIG. 4 or the optical signal 320 output from the data transmitter 402 of the communications system 300c of FIG. 3.

In some scenarios, once the acquisition and optical beam pointing is established, each terminal 302 transmits a telemetry signal 720, 720a-b to the other terminal through the optical link 322 that informs the other terminal 302 to reduce the divergence angle of the optical signal 320 during subsequent transmissions. For instance, the second terminal 302b may transmit a first telemetry signal 720a to the first terminal 302a that informs the first terminal 302a to reduce the divergence angle of the optical signal 320 during subsequent transmissions to the second terminal 302b through the optical link 322. Moreover, the second terminal 302b may receive a second telemetry signal 720b from the first terminal 302a that informs the second terminal to reduce the divergence angle of optical beam transmissions to the first terminal 302a through the optical link 322. By reducing the divergence angle of optical beam transmissions between the terminals 302a, 302b, the communications system 300d optimizes the optical beam pointing.

The example communications system 300d provides communications 20 between the first terminal 302a and the second terminal 302b through the free space optical link 322. Each communication 20 may include the telemetry signal 720, 720a-b and the optical signal 320. The optical signal 320 may include the data 321 and the modulated unique frequency tone 318 associated with the terminal 302 that transmits the optical signal 320. Once the terminals 302 reduce the divergence angle of their optical beam transmissions to optimize optical beam pointing with one another, the terminals 302 may cease the transmission of the telemetry signals 720. In some examples, the terminals coordinate divergence among optical beam transmissions based on real time clocks within predetermined time slots.

In some implementations, the receiver optics 308 at each of the terminals 302 includes a primary aperture 701 (e.g., lens), one or more photodetectors 702, 702a-n, and a telemetry receiver 712. In some examples, more than three photodetectors 702 are distributed around the periphery of the primary aperture 701. For instance, four photodetectors 702a-702d may be evenly distributed around the periphery of the primary aperture 701 of the receiving optics 308. In other examples, more than three photodetectors 702 are embedded in the receiving optics 308 to surround an optical path of optical signals 320 received by the receiving optics 308. The control hardware 800 at each of the terminals 302a, 302b may include a tracking analyzer 700, a telemetry analyzer 714, and the pointing adjustment module 416.

In some configurations, the telemetry signal 720 and the optical signal 320 associated with the communication 20 are co-propagated by the transmitter module 400 at the transmitting one of the terminals. For example, FIG. 6 shows the control hardware 800 providing the telemetry signal 720 to the transmitter module 400 and the transmitter module 400 co-propagating the telemetry signal 720 and the optical signal 320 of the communication 20 before the transmitter optics 306 transmit the communication 20 to the receiving one of the terminals 302. In other configurations, the transmitter optics 306 may couple the telemetry signal 720 and the associated optical signal 320 together when transmitting the communication 20. In these configurations, the terminals 302 each include an associated telemetry transmitter configured to transmit the telemetry signal 720 to the transmitter optics 306. Here, the telemetry signal 720 includes a dedicated channel different than a signal channel associated with the optical signal 320 of the communication 20.

The telemetry receiver 712 at the receiving one of the terminals 302 receive the telemetry signal 720 included in the communication 20 from the transmitting one of the terminals 302 and provide the telemetry signal 720 to the telemetry analyzer 714 of the control hardware 800. In some implementations, the telemetry signal 720 provides a divergence angle instruction 715 for subsequent optical signal 320 transmissions at the transmitting one of the terminals 302. The transmitting module 400 receives the divergence angle instruction 715 to provide a subsequently transmitted optical signal 320 with a reduced divergence angle for optimizing and maintaining the optical link 322. For instance, the telemetry analyzer 714 at the first terminal 302a may receive the telemetry signal 720a from the second terminal 302b and provide the divergence angle instruction 715 to the transmitting module 400a at the first terminal 302b for reducing the divergence angle of a subsequently transmitted optical signal 320 to the second terminal 302b.

Additionally or alternatively, the telemetry signal 720 may provide a transmitting angle instruction 717 for subsequent optical signal 320 transmissions at the transmitting one of the terminals 302. Here, the transmitting module 400 receives the transmitting angle instruction 717 to provide a subsequently transmitted optical signal 320 with a redirected transmitting angle (e.g., pitch and yaw) for maximizing the received data signal 321 and/or the received modulated unique frequency tone 318. For instance, the telemetry analyzer 714 at the first terminal 302a may receive the telemetry signal 720a from the second terminal 302b and provide the transmitting angle instruction 717 to the transmitting module 400a at the first terminal 302b for redirecting the transmitting angle of a subsequently transmitted optical signal 320 to the second terminal 302b.

In some implementations, the one or more photodetectors 702 each provide a respective photodetector input 704, 704a-n to the tracking analyzer 700 at the associated control hardware 800. Each photodetector input 704 is indicative of a received power 725 (FIG. 7) of the optical signal 320 as detected by the corresponding photodetector 702 when the receiving one of the terminals 302 receives the communication 20 including the optical signal 320. In some examples, the tracking analyzer 700 determines whether the received power 725 at each of the photodetectors 702 is balanced based on each of the received photodetector inputs 704. A determination by the tracking analyzer 700 that the received power 725 at the photodetectors 702 is unbalanced indicates that a center of the received optical signal 320 deviates from a center of the primary aperture 702. Accordingly, when the received power 725 at the photodetectors 702 is unbalanced, the tracking analyzer 700 provides an unbalanced power signal 716 to the pointing adjustment module 416 and the pointing adjustment module 416 provides the pointing adjustments 324 to adjust the pointing of the receiving optics 308 until the receiving optics (e.g., primary aperture 701) are centered with the optical signal 320 received from the other terminal 302. The pointing adjustment module 416 may include the pointing steering electronics 418 and/or the steering hardware 420 described above with reference to FIGS. 4 and 5.

Figure 7:
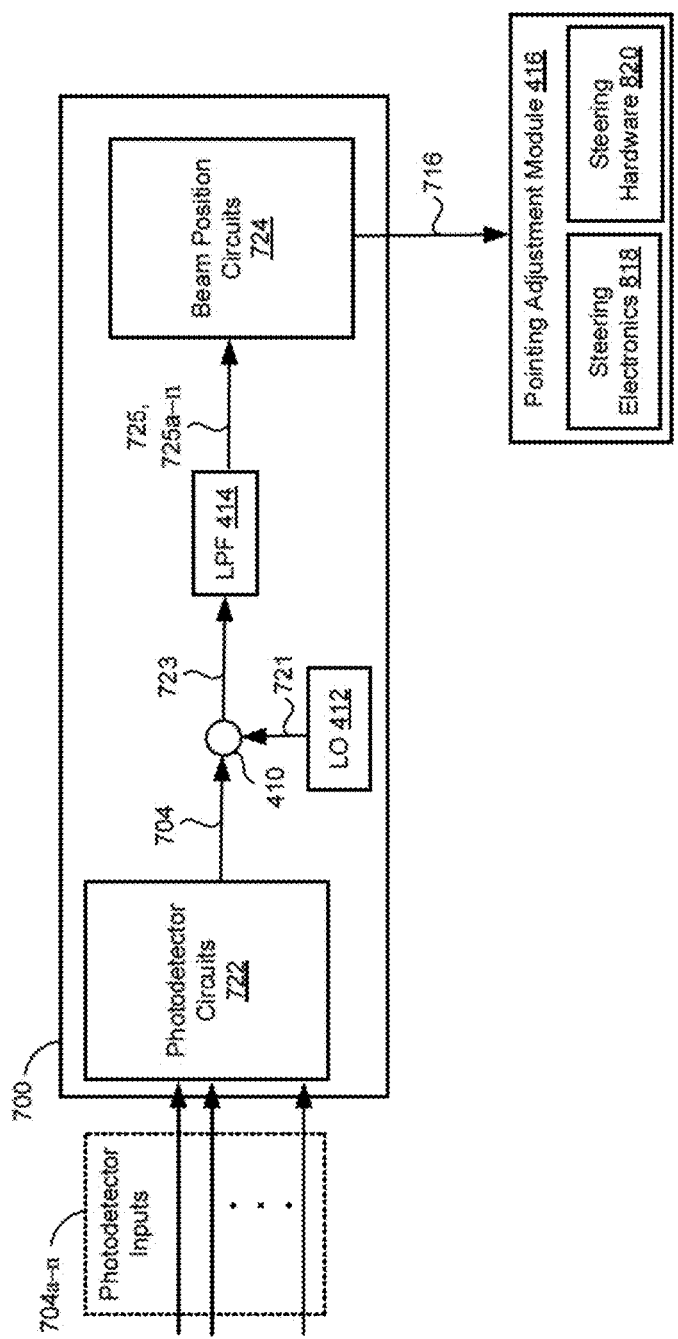
FIG. 7 is a schematic view of an example tracking analyzer using a phase-locked loop to increase detecting sensitivity of receiving optics at a communication terminal.

Referring to FIG. 7, in some implementations, the tracking analyzer 700 uses a phase-locked loop system to increase detecting sensitivity and/or to avoid steering the receiving optics 308 toward incorrect optical beam transmissions. The tracking analyzer 700 may include photodetector circuits 722, the mixer 410, the local oscillator (LO) 412, the LPF 414, and beam position circuits 724. The photodetector circuits 722 receive corresponding ones of the photodetector inputs 704, 704a-n from the photo detectors 702 and provide each photodetector input 704 to the mixer 410 for mixing with an interference signal 721 from the LO 412. The interference signal 721 may include a same frequency as a frequency of the received optical signal 320 to eliminate any noise from the optical signal 320 when received by the associated terminal 302. In some examples, the mixer 410 provides a mixed output signal 723 for each photodetector input 704 to the LPF 414 and the LPF 414 filters the mixed output signal 723 to determine the received power 725, 725a-n of the optical signal 320 as detected by each corresponding photodetector 702. In these examples, the beam position circuits 724 determine whether the received power 725 at each of the photodetectors 702 is balanced. The example of FIG. 7 shows the beam position circuits 724 providing the unbalanced power signal 716 to the pointing adjustment module 416. The pointing adjustment module 416 may include the pointing steering electronics 418 and/or the steering hardware 420 described above with reference to FIGS. 4 and 5.

Figure 8:
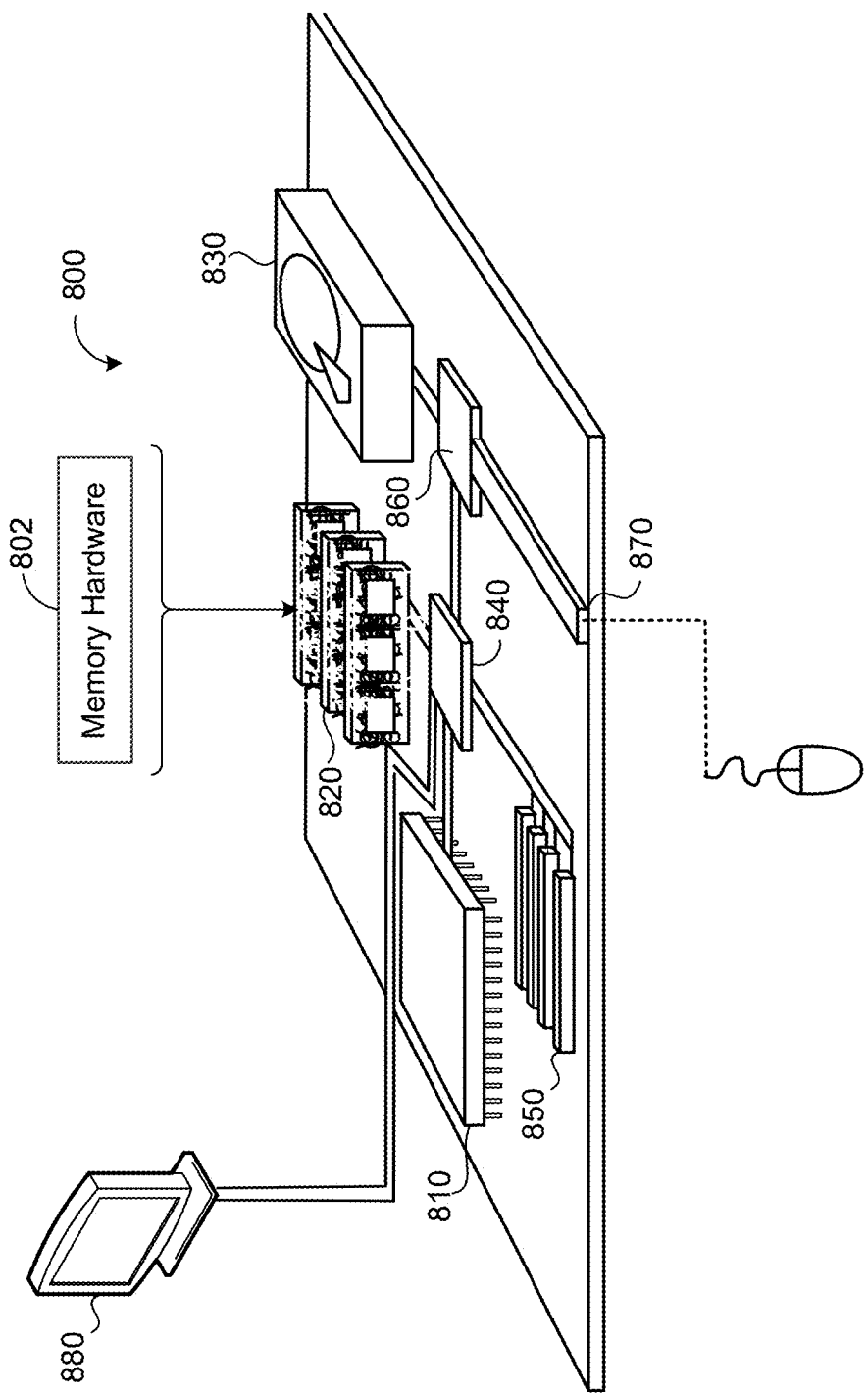
FIG. 8 is a schematic view of example control hardware of a communication terminal.

FIG. 8 is a schematic view of an example of the control hardware 800 that may be used to implement the systems and methods described in this document. The control hardware 800 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The control hardware 800 includes a processor 850, memory 820, a storage device 830, a high-speed interface/controller 840 connecting to the memory 820 and high-speed expansion ports 850, and a low speed interface/controller 860 connecting to a low speed bus 870 and storage device 830. Each of the components 810, 820, 830, 840, 850, and 860, are interconnected using various busses, and may be mounted on a common motherboard or in other manners as appropriate. The processor 810 can process instructions for execution within the computing device 800, including instructions stored in the memory 820 or on the storage device 830 to display graphical information for a GUI on an external input/output device, such as a display 880 coupled to a high speed interface 840. In other implementations, multiple processors and/or multiple buses may be used, as appropriate, along with multiple memories and types of memory. Also, multiple control hardware devices 800 may be connected, with each device providing portions of the necessary operations (e.g., as a server bank, a group of blade servers, or a multi-processor system).

The memory 820 includes hardware that stores information non-transitorily within the control hardware 800. The memory 820 may be a computer-readable medium, a volatile memory unit(s), or non-volatile memory unit(s). The non-transitory memory 820 may be physical devices used to store programs (e.g., sequences of instructions) or data (e.g., program state information) on a temporary or permanent basis for use by the control hardware 800. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs) as well as disks or tapes. Examples of volatile memory include, but are not limited to, random access memory (RAM), dynamic random access memory (DRAM), static random access memory (SRAM), phase change memory (PCM).

The storage device 830 is capable of providing mass storage for the control hardware 800. In some implementations, the storage device 830 is a computer-readable medium. In various different implementations, the storage device 830 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 820, the storage device 830, or memory on processor 810.

The high speed controller 840 manages bandwidth-intensive operations for the computing device 800, while the low speed controller 860 manages lower bandwidth-intensive operations. Such allocation of duties is exemplary only. In some implementations, the high-speed controller 840 is coupled to the memory 820, the display 880 (e.g., through a graphics processor or accelerator), and to the high-speed expansion ports 850, which may accept various expansion cards (not shown). In some implementations, the low-speed controller 860 is coupled to the storage device 830 and low-speed expansion port 870. The low-speed expansion port 870, which may include various communication ports (e.g., USB, Bluetooth, Ethernet, wireless Ethernet), may be coupled to one or more input/output devices, such as a keyboard, a pointing device, a scanner, or a networking device, such as a switch or router, e.g., through a network adapter.

The control hardware 800 may be implemented in a number of different forms, as shown in the figure. For example, it may be implemented as a standard server or multiple times in a group of such servers, as a laptop computer, or as part of a rack server system. In other implementations, the control hardware includes a field programmable gate array (FGPA), a digital signal processor (DSP), or any other suitable circuitry.

In some implementations, the control hardware 800 is in communication with memory hardware 802 (e.g., in the memory 820). The control hardware 800 at the first communication terminal 302a may determine a signal strength 415 of a modulated unique frequency tone 318a within the first optical signal 320a received from the second communication terminal 302b through the optical link 322. In some examples, the control hardware 800 adjusts an optical head 310a of the first communication terminal 302a to establish acquisition and optical beam pointing with the second communication terminal 302b based on the signal strength 415 of the modulated unique frequency tone 318a received from the second communication terminal 302b.

A software application (i.e., a software resource 110s) may refer to computer software that causes a computing device to perform a task. In some examples, a software application may be referred to as an "application," an "app," or a "program." Example applications include, but are not limited to, mobile applications, system diagnostic applications, system management applications, system maintenance applications, word processing applications, spreadsheet applications, messaging applications, media streaming applications, social networking applications, and gaming applications.

The memory hardware 110hm may be physical devices used to store programs (e.g., sequences of instructions) or data (e.g., program state information) on a temporary or permanent basis for use by a computing device 110hc. The non-transitory memory 110hm may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 9:
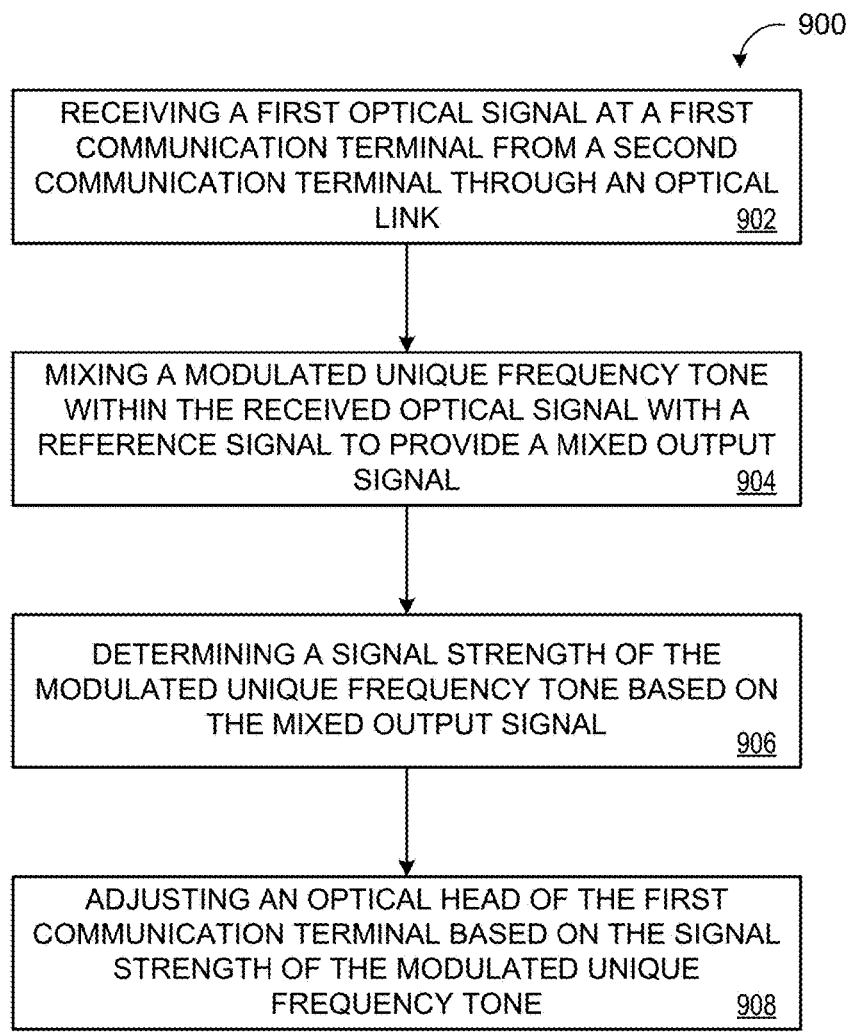
FIG. 9 is a flowchart of an example method for adjusting an optical head of a communication terminal based on a signal strength of a received modulated unique frequency tone.

FIG. 9 is a flow chart of an example method 900 for adjusting an optical head 310a of a first communication terminal 302a to establish acquisition and optical beam pointing with a second communication terminal. The flowchart starts at operation 902 where the first communication terminal 302a receives an optical signal 320a from the second communication terminal 302b through a free space optical link 322. The received optical signal 320a contains a modulated unique frequency tone 318a. In some examples, the second terminal 302b of FIG. 4 combines a data signal 321 including one or more data packets 321a-n and a beacon signal 318a modulated at the unique frequency tone 318a onto a multiplexed optical carrier including the optical signal 320a for transmission to the first terminal 302a. In these examples, the control hardware 800a at the first terminal 302a of FIG. 4 de-multiplexes the received optical signal 320a into the data signal 321 and the beacon signal 318a. In other examples, the second terminal 302b of FIG. 5 combines the modulated unique frequency tone 318a onto a modulated data signal 321 containing a stream of data packets 321a-n to produce the optical signal 320a for transmission to the first terminal 302. Here, the modulated unique frequency tone 318a may include a lower frequency than a frequency of the modulated data signal 321. Additionally or alternatively, the modulated unique frequency tone 318a may include a smaller power modulation depth than the modulated data signal 321.

At operation 904, the control hardware 800a at the first terminal 302a mixes the modulated unique frequency tone 318a with a reference signal 411 to provide a mixed output signal 413. Here, the reference signal 411 includes the same frequency as the modulated unique frequency tone 318 and a local oscillator 412 may provide the reference signal 411. The mixed output signal 413 may eliminate noise from the modulated unique frequency tone 318a when the optical signal 320a is received by the first terminal 302a. At operation 906, the control hardware 800a at the first terminal 302a determines the signal strength 415 of the modulated unique frequency tone 318a based on the mixed output signal 413, and at operation 908, the control hardware 800a adjusts the optical head 310a of the first terminal 302a to establish the acquisition and optical beam pointing with the second terminal 302b based on the signal strength 415 of the modulated unique frequency tone 318a received from the second terminal 302b.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:
   receiving, at a first communication terminal, an optical signal from a second communication terminal using receiving optics of the first communication terminal, the received optical signal including a modulated unique frequency tone;
   mixing, by control hardware of the first communication terminal, the modulated unique frequency tone with a reference signal to provide a mixed output signal, the reference signal comprising a same frequency as the modulated unique frequency tone;
   determining, by the control hardware, a received power of the received optical signal at each of one or more photodetectors associated with the receiving optics of the first communication terminal based on the mixed output signal;
   adjusting, by the control hardware, a pointing of the receiving optics of the first communication terminal based on the determined received power at each of the one or more photodetectors; and
   transmitting a first telemetry signal from the first communication terminal to the second communication terminal, the first telemetry signal including instructions to the second communication terminal to adjust the optical signal during subsequent transmissions to the first communication terminal based on the determined received power at each of the one or more photodetectors.

2. The method of claim 1, wherein receiving the optical signal from the second communication terminal includes de-multiplexing, by the control hardware, the received optical signal into a data signal and a beacon signal.

3. The method of claim 1, wherein mixing the modulated unique frequency tone includes mixing the received optical signal with the reference signal from a local oscillator of the first communication terminal to provide the mixed output signal.

4. The method of claim 1, wherein receiving the optical signal from the second communication terminal includes:
   splitting, by the control hardware, the optical signal into a modulated data signal and the modulated unique frequency tone; and
   encoding, by the control hardware, a stream of data packets on the modulated data signal.

5. The method of claim 1, further comprising:
   filtering, by the control hardware, the mixed output signal to extract a direct-current component from the mixed output signal; and
   determining, by the control hardware, the received power of the optical signal based on a value of the direct-current component extracted from the mixed output signal.

6. The method of claim 1, wherein the adjusting pointing of the receiving optics of the first communication terminal establishes acquisition and optical beam pointing with the second communication terminal by increasing the received power of the optical signal received from the second communication terminal.

7. The method of claim 1, wherein the first telemetry signal includes instructions to the second communication terminal to reduce a divergence angle of the optical signal during subsequent transmissions to the first communication terminal based on the determined received power at each of the one or more photodetectors.

8. The method of claim 1, wherein the first telemetry signal includes instructions to the second communication terminal to redirect a transmitting angle of the optical signal during subsequent transmissions to the first communication terminal based on the determined received power at each of the one or more photodetectors.

9. A first communication terminal comprising:
receiving optics configured to receive an optical signal from a second communication terminal, the received optical signal including a modulated unique frequency tone;
control hardware in communication with the receiving optics; and
memory hardware in communication with the control hardware, the memory hardware storing instructions that when executed on the control hardware cause the control hardware to perform operations comprising:
mixing the modulated unique frequency tone with a reference signal to provide a mixed output signal, the reference signal comprising a same frequency as the modulated unique frequency tone;
determining a received power of the received optical signal at each of one or more photodetectors associated with the receiving optics based on the mixed output signal;
adjusting a pointing of the receiving optics based on the determined received power at each of the one or more photodetectors; and
transmitting a first telemetry signal from the first communication terminal to the second communication terminal, the first telemetry signal including instructions to the second communication terminal to adjust the optical signal during subsequent transmissions to the first communication terminal based on the determined received power at each of the one or more photodetectors.

10. The first communication terminal of claim 9, wherein the operations further comprise de-multiplexing the received optical signal into a data signal and a beacon signal.

11. The first communication terminal of claim 9, wherein mixing the modulated unique frequency tone includes mixing the received optical signal with the reference signal from a local oscillator of the first communication terminal to provide the mixed output signal.

12. The first communication terminal of claim 9, wherein the operations further comprise:
splitting the optical signal into a modulated data signal and the modulated unique frequency tone; and
encoding a stream of data packets on the modulated data signal.

13. The first communication terminal of claim 9, wherein the operations further comprise:
filtering the mixed output signal to extract a direct-current component from the mixed output signal; and
determining the received power of the optical signal based on a value of the direct-current component extracted from the mixed output signal.

14. The first communication terminal of claim 9, wherein the adjusting point of the receiving optics establishes acquisition and optical beam pointing with the second communication terminal by increasing the received power of the optical signal received from the second communication terminal.

15. The first communication terminal of claim 9, further comprising:
transmitter optics configured to transmit an optical signal to the second communication terminal; and
wherein the first telemetry signal includes instructions to the second communication terminal to reduce a divergence angle of the optical signal during subsequent transmissions to the first communication terminal based on the determined received power at each of the one or more photodetectors.

16. The first communication terminal of claim 9, further comprising:
transmitter optics configured to transmit an optical signal to the second communication terminal; and
wherein the first telemetry signal includes instructions to the second communication terminal to redirect a transmitting angle of the optical signal during subsequent transmissions to the first communication terminal based on the determined received power at each of the one or more photodetectors.

17. A non-transitory, tangible computer-readable storage medium on which computer readable instructions of a program are stored, the instructions, when executed by control hardware, cause the control hardware to perform operations comprising:
receiving an optical signal from a second communication terminal using receiving optics of a first communication terminal, the received optical signal including a modulated unique frequency tone;
mixing the modulated unique frequency tone with a reference signal to provide a mixed output signal, the reference signal comprising a same frequency as the modulated unique frequency tone;
determining a received power of the received optical signal at each of one or more photodetectors associated with the receiving optics of the first communication terminal based on the mixed output signal;
adjusting a pointing of the receiving optics of the first communication terminal based on the determined received power at each of the one or more photodetectors; and
transmitting a first telemetry signal from the first communication terminal to the second communication terminal, the first telemetry signal including instructions to the second communication terminal to adjust the optical signal during subsequent transmissions to the first communication terminal based on the determined received power at each of the one or more photodetectors.

18. The medium of claim 17, further comprising:
filtering, by the control hardware, the mixed output signal to extract a direct-current component from the mixed output signal; and
determining, by the control hardware, the received power of the optical signal based on a value of the direct-current component extracted from the mixed output signal.

19. The medium of claim 17, wherein the adjusting pointing of the receiving optics of the first communication terminal establishes acquisition and optical beam pointing with the second communication terminal by increasing the received power of the optical signal received from the second communication terminal.

20. The medium of claim 17, wherein the first telemetry signal includes instructions to the second communication terminal to adjust a divergence angle of the optical signal during subsequent transmissions to the first communication terminal based on the determined received power at each of the one or more photodetectors.

* * * * *